US008918047B1

(12) United States Patent
Teller et al.

(10) Patent No.: US 8,918,047 B1
(45) Date of Patent: Dec. 23, 2014

(54) USE OF SATELLITE-BASED ROUTING PROCESSES WITH A BALLOON NETWORK

(75) Inventors: Eric Teller, San Francisco, CA (US); Michael Cassidy, Menlo Park, CA (US); Clifford L. Biffle, Berkeley, CA (US); Richard W. DeVaul, Mountain View, CA (US)

(73) Assignee: Google Inc., Mountain View, CA (US)

( * ) Notice: Subject to any disclaimer, the term of this patent is extended or adjusted under 35 U.S.C. 154(b) by 212 days.

(21) Appl. No.: 13/532,884

(22) Filed: Jun. 26, 2012

(51) Int. Cl.
*H04B 1/60* (2006.01)
*H04B 17/02* (2006.01)

(52) U.S. Cl.
USPC .................................. 455/9; 455/15; 455/427

(58) Field of Classification Search
USPC .............................. 455/9, 15, 427, 456.1, 507
See application file for complete search history.

(56) References Cited

U.S. PATENT DOCUMENTS

| 6,151,308 A * | 11/2000 | Ibanez-Meier et al. ....... 370/316 |
| 6,167,263 A | 12/2000 | Campbell |
| 7,046,934 B2 | 5/2006 | Badesha |
| 7,341,224 B1 | 3/2008 | Osann |
| 7,567,779 B2 * | 7/2009 | Seligsohn et al. ........... 455/12.1 |
| 7,738,837 B2 * | 6/2010 | Karabinis ................... 455/12.1 |
| 7,974,571 B2 | 7/2011 | Dankberg |

* cited by examiner

Primary Examiner — Tuan H Nguyen
(74) Attorney, Agent, or Firm — McDonnell Boehnen Hulbert & Berghoff LLP

(57) ABSTRACT

This disclosure relates to the use of satellite-based routing processes in connection with a balloon network. A disclosed method includes receiving a communication at a balloon in a balloon network by way of a transmission from a ground-based station. The method includes selecting a routing process for the communication based on at least one parameter associated with the communication. The routing process is selected from a plurality of routing processes including a first routing process and a second routing process. The first routing process includes a satellite network when determining how to route the communication. The satellite network includes one or more satellites. The second routing process includes the balloon network when determining how to route the communication. The method further includes using the selected routing process to determine a target path for the communication.

21 Claims, 10 Drawing Sheets

US 8,918,047 B1

USE OF SATELLITE-BASED ROUTING PROCESSES WITH A BALLOON NETWORK

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In an aspect, this disclosure provides a method. The method includes receiving a communication at a balloon in a balloon network. The communication is received by way of a transmission from a ground-based station. The method further includes selecting a routing process for the communication based on at least one parameter associated with the communication. The routing process is selected from a plurality of routing processes including a first routing process and a second routing process. The first routing process includes a satellite network when determining how to route the communication. The satellite network includes one or more satellites. The second routing process includes the balloon network when determining how to route the communication. The method further includes using the selected routing process to determine a target path for the communication.

In another aspect, this disclosure provides a balloon system. The balloon system includes a communication system. The communication system is operable to receive a communication by way of a transmission from a ground-based station. The balloon system also includes a controller. The controller is operable to perform functions. The functions include selecting a routing process for the communication based on at least one parameter associated with the communication. The routing process is selected from a plurality of routing processes including a first routing process and a second routing process. The first routing process includes a satellite network when determining how to route the communication. The satellite network includes one or more satellites. The second routing process includes the balloon network when determining how to route the communication. The functions further include using the selected routing process to determine a target path for the communication.

In yet another aspect, this disclosure provides an apparatus. The apparatus includes at least one computer-readable medium having stored thereon program instructions that, upon execution by a computing device, cause the computing device to perform functions. The functions include selecting a routing process for a communication based on at least one parameter associated with the communication. The communication is received by way of a transmission from a ground-based station. The routing process is selected from a plurality of routing processes including a first routing process and a second routing process. The first routing process includes a satellite network when determining how to route the communication. The satellite network includes a plurality of satellites. The second routing process includes a balloon network when determining how to route the communication. The functions further include causing a balloon system to use the selected routing process to determine a target path for the communication.

DETAILED DESCRIPTION

I. Overview

Figure 1:
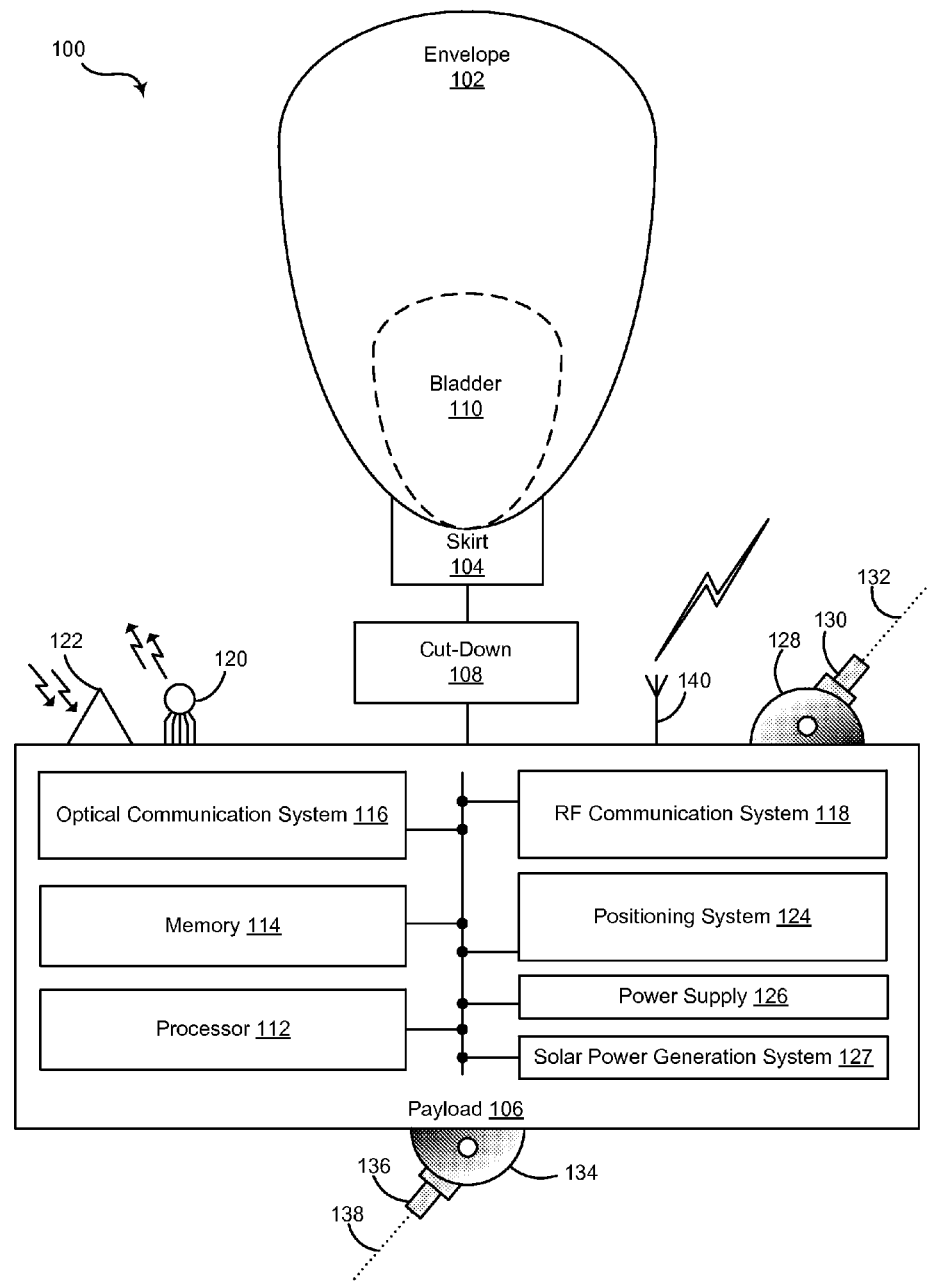
FIG. 1 illustrates a high-altitude balloon, according to an embodiment.

Illustrative embodiments can implement satellite-based routing processes with a data network of balloons, such as, for example, a mesh network of high-altitude balloons deployed in the stratosphere. The satellite-based routing processes can route data to a satellite network in situations when the satellite network is needed or desired to supplement the balloon network, among other situations. The satellite network can be useful for supplementing the balloon network in various scenarios. For example, the satellite network can be a useful supplement when the balloon network has a high latency. As another example, the satellite network can be a useful supplement when the balloon network provides insufficient coverage in a given area.

To this end, an illustrative embodiment uses a high-altitude balloon network. In the balloon network, the balloons can communicate with one another using free-space optical communications. The balloon network can have a multiple-tier network structure, in which some of the balloons serve as super-nodes and other balloons serve as sub-nodes. In this network structure, the sub-nodes can communicate with ground-based stations using radio-frequency communications, as well as with other balloons. The super-nodes can communicate with satellites, as well as with other balloons. Instead of using the multiple-tier network structure, the balloon network can use a network structure in which all of the balloons can communicate with other balloons, ground-based stations, and satellites.

When the balloon network receives a communication from a ground-based station, the balloon network can analyze the communication, the state of the balloon network itself, or both in order to select one of several routing processes for the communication. The selected routing process can determine a target path for the communication. Of the routing processes, a first routing process includes a satellite network when determining how to route the communication. Thus, when the first routing process is utilized one or more satellites may be included in the determined path. Note that for various reasons, it is possible that the first routing process may consider whether to route the communication through the satellite network, but ultimately conclude that the routing path should not include the satellite network. A second of the routing process does not include the satellite network when determining how to route the communication, and thus, the second routing process will always determine a path that uses the balloon network and does not use the satellite network. In this way, the balloon network can select a routing process that uses the satellite network in situations when the satellite network is needed and/or desired to supplement the balloon network, among other situations.

In addition, the balloon network can serve as an intermediary to the satellite network. To this end, the balloon network can perform various functions to ensure that data sent from a ground-based station is suitable for communication with the satellite network. For example, the balloon network can convert the data from a ground-based protocol to a protocol that is suitable for use with the satellite network. Other examples include amplifying the signals containing the data and supplementing the data with error-correction or error-detection information.

II. Balloon Configuration

FIG. 1 illustrates a high-altitude balloon 100, according to an embodiment. The balloon 100 includes an envelope 102, a skirt 104, a payload 106, and a cut-down system 108 that is attached between the envelope 102 and the payload 106.

The envelope 102 and the skirt 104 can take various forms, which can be currently well-known or yet to be developed. For instance, the envelope 102, the skirt 104, or both can be made of metalized Mylar® or BoPET (biaxially-oriented polyethylene terephthalate). Some or all of the envelope 102, the skirt 104, or both can be constructed from a highly-flexible latex material or a rubber material, such as, for example, chloroprene. These examples are illustrative only; other materials can be used as well. Further, the shape and size of the envelope 102 and the skirt 104 can vary depending upon the particular implementation. Additionally, the envelope 102 can be filled with various different types of gases, such as, for example, helium, hydrogen, or both. These examples are illustrative only; other types of gases can be used as well.

The payload 106 of the balloon 100 includes a processor 112 and memory 114. The memory 114 can be or include a non-transitory computer-readable medium. The non-transitory computer-readable medium can have instructions stored thereon, which can be accessed and executed by the processor 112 in order to carry out some or all of the functions provided in this disclosure.

The payload 106 of the balloon 100 can also include various other types of equipment and systems to provide a number of different functions. For example, the payload 106 includes an optical communication system 116. The optical communication system 116 can transmit optical signals by way of an ultra-bright LED system 120. In addition, the optical communication system 116 can receive optical signals by way of an optical-communication receiver, such as, for example, a photo-diode receiver system. Further, the payload 106 can include an RF communication system 118. The RF communication system 118 can transmit and/or receive RF communications by way of an antenna system 140.

In addition, the payload 106 includes a power supply 126. The power supply 126 can be used to provide power to the various components of the balloon 100. The power supply 126 can be or include a rechargeable battery. In some implementations, the power supply 126 can represent another suitable power supply known in the art for producing power. In addition, the balloon 100 includes a solar power generation system 127. The solar power generation system 127 can include solar panels, which can be used to generate power for charging the power supply 126 or for distribution by the power supply 126.

Further, the payload 106 includes various types of sensors 128. The payload 106 can include sensors such as, for example, video or still cameras, a GPS system, motion sensors, accelerometers, gyroscopes, compasses, or sensors for capturing environmental data. These examples are illustrative only; the payload 106 can include various other types of sensors. Further, some or all of the components in the payload 106 can be implemented in a radiosonde, which can be operable to measure various types of information, such as, for example, pressure, altitude, geographical position (latitude and longitude), temperature, relative humidity, wind speed, or direction, among other information.

As noted above, the payload 106 includes an ultra-bright LED system 120. In some implementations, the ultra-bright LED system 120 can be used for free-space optical communication with other balloons. In some implementations, the ultra-bright LED system 120 can be used for free-space optical communication with satellites. In some implementations, the ultra-bright LED system 120 can be used for free-space optical communication both with other balloons and with satellites. To this end, the optical communication system 116 can be configured to transmit a free-space optical signal by causing modulations in the ultra-bright LED system 120. The manner in which the optical communication system 116 is implemented can vary, depending upon the particular application.

In addition, the balloon 100 can be configured for altitude control. For instance, the balloon 100 can include a variable buoyancy system. The buoyancy system can be configured to change the altitude of the balloon 100 by adjusting the volume, the density, or both of the gas in the envelope 102 of the balloon 100. A variable buoyancy system can take various forms, and can generally be any system that can change the volume and/or density of gas in the envelope 102 of the balloon 100.

In an embodiment, a variable buoyancy system can include a bladder 110 that is located inside of the envelope 102. The bladder 110 can be an elastic chamber that is configured to hold liquid and/or gas. Alternatively, the bladder 110 need not be inside the envelope 102. For instance, the bladder 110 can be a rigid bladder that can be pressurized well beyond neutral pressure. The buoyancy of the balloon 100 can therefore be adjusted by changing the density and/or volume of the gas in the bladder 110. To change the density in the bladder 110, the balloon 100 can be configured with systems and/or mechanisms for heating and/or cooling the gas in the bladder 110. Further, to change the volume, the balloon 100 can include pumps or other features for adding gas to and/or removing gas from the bladder 110. To change the volume of the bladder 110, the balloon 100 can include release valves or other features that are controllable to allow gas to escape from the bladder 110. Multiple bladders 110 can be implemented within the scope of this disclosure. For instance, multiple bladders can be used to improve balloon stability.

In an embodiment, the envelope 102 can be filled with helium, hydrogen, or other material that is lighter than air. Thus, the envelope 102 can have an associated upward buoyancy force. In this embodiment, air in the bladder 110 can be considered a ballast tank that can have an associated downward ballast force. In another embodiment, the amount of air in the bladder 110 can be changed by pumping air (for example, with an air compressor) into and out of the bladder 110. By adjusting the amount of air in the bladder 110, the ballast force can be controlled. In some embodiments, the ballast force can be used, in part, to counteract the buoyancy force and/or to provide altitude stability.

In some embodiments, the envelope 102 can be substantially rigid and include an enclosed volume. Air can be evacuated from the envelope 102 while the enclosed volume is substantially maintained. In other words, at least a partial vacuum can be created and maintained within the enclosed volume. Thus, the envelope 102 and the enclosed volume can become lighter than air and provide a buoyancy force. In some embodiments, air or another material can be controllably introduced into the partial vacuum of the enclosed volume in an effort to adjust the overall buoyancy force and/or to provide altitude control.

In an embodiment, a portion of the envelope 102 can be a first color (for example, black) and/or a first material that is different from another portion or the remainder of the envelope 102. The other portion or the remainder of the envelope can have a second color (for example, white) and/or a second material. For instance, the first color and/or first material can be configured to absorb a relatively larger amount of solar energy than the second color and/or second material. Thus, rotating the balloon such that the first material is facing the sun can act to heat the envelope 102 as well as the gas inside the envelope 102. In this way, the buoyancy force of the envelope 102 can increase. By rotating the balloon such that the second material is facing the sun, the temperature of gas inside the envelope 102 can decrease. Accordingly, the buoyancy force can decrease. In this manner, the buoyancy force of the balloon can be adjusted by changing the temperature/volume of gas inside the envelope 102 using solar energy. In this embodiment, a bladder need not be an element of the balloon 100. Thus, in this embodiment, altitude control of the balloon 100 can be achieved, at least in part, by adjusting the rotation of the balloon 100 with respect to the sun.

Further, the payload 106 of the balloon 100 can include a navigation system (not shown in FIG. 1). The navigation system can implement station-keeping functions to maintain position within and/or move to a position in accordance with a desired topology. In particular, the navigation system can use altitudinal wind data to determine altitudinal adjustments that result in the wind carrying the balloon in a desired direction and/or to a desired location. The altitude-control system can then make adjustments to the density of the balloon chamber in order to effectuate the determined altitudinal adjustments and cause the balloon to move laterally to the desired direction and/or to the desired location.

Alternatively, the altitudinal adjustments can be computed by a ground-based control system and communicated to the high-altitude balloon. As another alternative, the altitudinal adjustments can be computed by a ground-based or satellite-based control system and communicated to the high-altitude balloon. Furthermore, in some embodiments, specific balloons in a heterogeneous balloon network can be configured to compute altitudinal adjustments for other balloons and transmit the adjustment commands to those other balloons.

In addition, the balloon 100 includes a cut-down system 108. The cut-down system 108 can be activated to separate the payload 106 from the rest of the balloon 100. This functionality can be utilized anytime the payload needs to be accessed on the ground, such as, for example, when it is time to remove the balloon 100 from a balloon network, when maintenance is due on systems within the payload 106, or when the power supply 126 needs to be recharged or replaced.

In an embodiment, the cut-down system 108 can include a connector, such as, for example, a balloon cord, that connects the payload 106 to the envelope 102. In addition, the cut-down system 108 can include a mechanism for severing the connector (for example, a shearing mechanism or an explosive bolt). In an embodiment, the balloon cord, which can be nylon, is wrapped with a nichrome wire. A current can be passed through the nichrome wire to heat it and melt the cord, cutting the payload 106 from the envelope 102. Other types of cut-down systems and/or variations on the illustrated cut-down system 108 are possible as well.

In an alternative arrangement, a balloon may not include a cut-down system. In such an arrangement, the navigation system can be operable to navigate the balloon to a landing location, in the event the balloon needs to be removed from the network and/or accessed on the ground. Further, a balloon can be self-sustaining so that it does not need to be accessed on the ground. In some embodiments, a balloon can be serviced in-flight by one or more service balloons or by another type of service aerostat or service aircraft.

III. Balloon Networks

Figure 2:
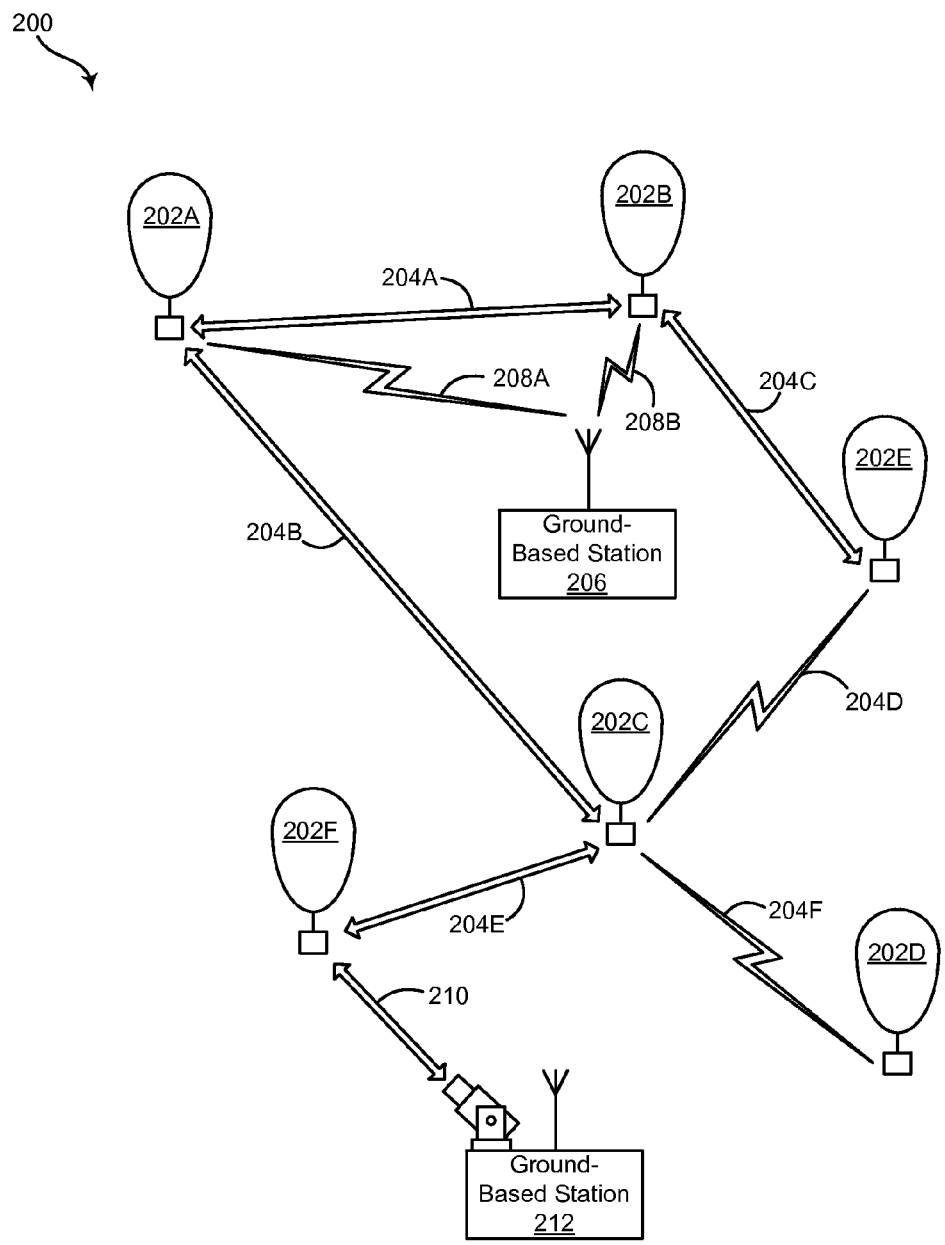
FIG. 2 illustrates a balloon network, according to an embodiment.

FIG. 2 illustrates a balloon network 200, according to an embodiment. The balloon network 200 includes balloons 202A-202F. The balloons 202A-202F are configured to communicate with one another by way of free-space optical links 204A-204F. Configured as such, the balloons 202A to 202F can collectively function as a mesh network for packet-data communications. Further, at least some of the balloons 202A-202F, such as, for example, the balloons 202A and 202B, can be configured for RF communications with a ground-based station 206 by way of respective RF links 208A and 208B. The ground-based station 206 represents one or more ground-based stations. In addition, some of the balloons 202A-202F, such as, for example, the balloon 202F, can be configured to communicate by way of an optical link 210 with a ground-based station 212. The ground-based station 212 represents one or more ground-based stations.

In an embodiment, the balloons 202A-202F are high-altitude balloons, which can be deployed in the stratosphere. At moderate latitudes, the stratosphere includes altitudes between approximately 10 kilometers (km) and 50 km above the Earth's surface. At the poles, the stratosphere starts at an altitude of approximately 8 km. In an embodiment, high-altitude balloons can be configured to operate in an altitude range within the stratosphere that has relatively low wind-speeds, such as, for example, between 5 and 20 miles per hour (mph).

In the high-altitude-balloon network 200, the balloons 202A-202F can be configured to operate at altitudes between 18 km and 25 km. In some implementations, the balloons 202A-202F can be configured to operate at other altitudes. The altitude range of 18 km-25 km can be advantageous for several reasons. In particular, this layer of the stratosphere generally has relatively low wind speeds (for example, winds between 5 and 20 mph) and relatively little turbulence. Further, while the winds in this altitude range can vary with latitude and by season, the variations can be modeled in a reasonably accurate manner. In addition, altitudes above 18 km are typically above the maximum flight level designated for commercial air traffic. Therefore, interference with commercial flights is not a significant concern when balloons are deployed between 18 km and 25 km.

To transmit data to another balloon, a given balloon 202A-202F can be configured to transmit an optical signal by way of a corresponding optical link 204A-204F. In an embodiment, some or all of the balloons 202A-202F can use one or more high-power light-emitting diodes (LEDs) to transmit an optical signal. Alternatively, some or all of the balloons 202A-202F can include laser systems for free-space optical communications over corresponding optical links 204A-204F. Other types of free-space optical communication are possible. Further, in order to receive an optical signal from another balloon by way of an optical link, a given balloon 202A-202F can include one or more optical receivers, as discussed above in connection with FIG. 1.

The balloons 202A-202F can utilize one or more of various different RF air-interface protocols for communication with ground-based stations, such as, for example, the ground-based station 206. For instance, some or all of the balloons 202A-202F can be configured to communicate with the ground-based station 206 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

There can be scenarios where the RF links 208A-208B do not provide a desired link capacity for balloon-ground communications. For instance, increased capacity can be desirable to provide backhaul links from a ground-based gateway. Accordingly, a balloon network can also include downlink balloons, which can provide a high-capacity air-ground link.

For example, in the balloon network 200, the balloon 202F is configured as a downlink balloon. Like other balloons in the balloon network 200, the downlink balloon 202F can be operable for optical communication with other balloons by way of corresponding optical links 204A-204F. The downlink balloon 202F can also be configured for free-space optical communication with the ground-based station 212 by way of the optical link 210. The optical link 210 can therefore serve as a high-capacity link (as compared to the RF links 208A-208B) between the balloon network 200 and the ground-based station 212.

Note that in some implementations, the downlink balloon 202F can be operable for RF communication with the ground-based stations 206. In other implementations, the downlink balloon 202F may only use the optical link 210 for balloon-to-ground communications. Further, while the arrangement shown in FIG. 2 includes one downlink balloon 202F, a balloon network can also include multiple downlink balloons. In addition, a balloon network can be implemented without the use of any downlink balloons.

In some implementations, a downlink balloon can be equipped with a specialized, high-bandwidth RF communication system for balloon-to-ground communications, instead of, or in addition to, a free-space optical communication system. The high-bandwidth RF communication system can take the form of an ultra-wideband system, which can provide an RF link with substantially the same capacity as one of the optical links 204A-204F.

Ground-based stations, such as the ground-based stations 206 and 212, can take various forms. Generally, a ground-based station includes components such as transceivers, transmitters, and receivers for communication with a balloon network by way of RF links, optical links, or both. Further, a ground-based station can use various air-interface protocols in order to communicate with one or more of the balloons 202A-202F by way of an RF link. As such, a ground-based station 206 can be configured as an access point by which various devices can connect to the balloon network 200. The ground-based station 206 can have other configurations and can serve other purposes without departing from the scope of this disclosure.

Some or all of the balloons 202A-202F can be configured to establish a communication link with space-based satellites by way of corresponding communication links. The balloons can establish the communication links with the space-based satellites in addition to, or as an alternative to, the ground-based communication links. In addition, the balloons can be configured to communicate with the space-based satellites using any suitable protocol. In some implementations, one or more of the communication links can be optical links. Accordingly, one or more of the balloons can communicate with the satellites by way of free-space optical communication. Other balloon-satellite communication links and techniques can be used.

Further, some ground-based stations, such as, for example, the ground-based station 206, can be configured as gateways between the balloon network 200 and another network. For example, the ground-based station 206 can serve as an interface between the balloon network 200 and the Internet, a cellular service provider's network, or another network.

A. Mesh-Network Functionality

As noted above, the balloons 202A-202F can collectively function as a mesh network. More specifically, because the balloons 202A-202F can communicate with one another using free-space optical links, the balloons can collectively function as a free-space optical mesh network.

In a mesh-network configuration, each of the balloons 202A-202F can function as a node of the mesh network. The mesh network can be operable to receive data directed to it and to route data to other balloons. As such, data can be routed from a source balloon to a destination balloon by determining an appropriate sequence of optical links between the source balloon and the destination balloon. This disclosure may refer to these optical links, collectively, as a "lightpath" for the connection between the source and destination balloons. Further, this disclosure may refer to each of the optical links as a "hop" along the lightpath.

To operate as a mesh network, the balloons 202A-202F can employ various routing techniques and self-healing algorithms. In some implementations, the balloon network 200 can employ adaptive or dynamic routing, in which a lightpath between a source balloon and a destination balloon is determined and set-up when the connection is needed, and is released at a later time. Further, when adaptive routing is used, the lightpath can be determined dynamically, depending upon the current state, past state, and/or predicted state of the balloon network.

In addition, the network topology can change as the balloons 202A-202F move relative to one another and/or relative to the ground. Accordingly, the balloon network 200 can apply a mesh protocol to update the state of the network as the topology of the network changes. For example, to address the mobility of the balloons 202A-202F, the balloon network 200 can employ and/or adapt various techniques that are employed in mobile ad hoc networks (MANETs).

In some implementations, the balloon network 200 can be configured as a transparent mesh network. In a transparent balloon network, the balloons can include components for physical switching in a way that is entirely optical, without involving a substantial number of, or any, electrical components in the physical routing of optical signals. Accordingly, in a transparent configuration with optical switching, signals can travel through a multi-hop lightpath that is entirely optical.

In other implementations, the balloon network 200 can implement a free-space optical mesh network that is opaque. In an opaque configuration, some or all of the balloons 202A-202F can implement optical-electrical-optical (OEO) switching. For example, some or all of the balloons 202A-202F can include optical cross-connects (OXCs) for OEO conversion of optical signals. This example is illustrative only; other opaque configurations can be used.

The balloons 202A-202F in the balloon network 200 can utilize techniques such as wavelength division multiplexing (WDM) in order to increase link capacity. When WDM is implemented with transparent switching, physical lightpaths through the balloon network can be subject to the wavelength continuity constraint. In particular, because switching in a transparent network is entirely optical, it can be necessary, in some instances, to assign the same wavelength to all optical links along a given lightpath.

An opaque configuration can be used to avoid the wavelength continuity constraint. In particular, balloons in an opaque balloon network can include OEO switching systems operable for wavelength conversion. As a result, balloons can convert the wavelength of an optical signal at corresponding hops along a lightpath.

Further, various routing algorithms can be employed in an opaque configuration. For example, to determine a primary lightpath and/or one or more diverse backup lightpaths for a given connection, a balloon can apply shortest-path routing techniques, such as, for example, Dijkstra's algorithm and k-shortest path. In addition, a balloon can apply edge and node-diverse or disjoint routing, such as, for example, Suurballe's algorithm. Further, a technique for maintaining a particular quality of service (QoS) can be employed when determining a lightpath.

B. Station-Keeping Functionality

In an embodiment, a balloon network 100 can implement station-keeping functions to help provide a desired network topology. For example, station-keeping can involve each of the balloons 202A-202F maintaining a position or moving to a position relative to one or more other balloons in the network 200. The station-keeping can also, or instead, involve each of the balloons 202A-202F maintaining a position or moving to a position relative to the ground. Each of the balloons 202A-202F can implement station-keeping functions to determine the given balloon's desired positioning in the desired topology, and if desirable, to determine how the given balloon is to move to the desired position.

The network topology can vary depending on the desired implementation. In an implementation, the balloons 202A-202F can implement station-keeping such that the balloon network 200 has a substantially uniform topology. For example, a given balloon can implement station-keeping functions to position itself at substantially the same distance (or within a certain range of distances) from adjacent balloons in the balloon network. In another implementation, the balloons 202A-202F can implement station-keeping such that the balloon network 200 has a substantially non-uniform topology. This implementation can be useful when there is a need for balloons to be distributed more densely in some areas than in others. For example, to help meet higher bandwidth demands that are typical in urban areas, balloons can be clustered more densely over urban areas than in other areas. For similar reasons, the distribution of balloons can be denser over land than over large bodies of water. These examples are illustrative only; non-uniform topologies can be used in other settings.

In addition, the topology of a balloon network can be adaptable. In particular, balloons can utilize station-keeping functionality to allow the balloons to adjust their respective positioning in accordance with a change in the topology of the network. For example, several balloons can move to new positions in order to change a balloon density in a given area.

In an implementation, the balloon network 200 can employ an energy function to determine whether balloons should move in order to provide a desired topology. In addition, the energy function can indicate how the balloons should move in order to provide the desired topology. In particular, a state of a given balloon and states of some or all nearby balloons can be used as inputs to an energy function. The energy function can apply the states to a desired network state, which can be a state corresponding to the desired topology. A vector indicating a desired movement of the given balloon can then be determined by determining a gradient of the energy function. The given balloon can then determine appropriate actions to take in order to effectuate the desired movement. For example, a balloon can determine an altitude adjustment or adjustments such that winds will move the balloon in the desired manner.

C. Control of Balloons in a Balloon Network

Figure 3:
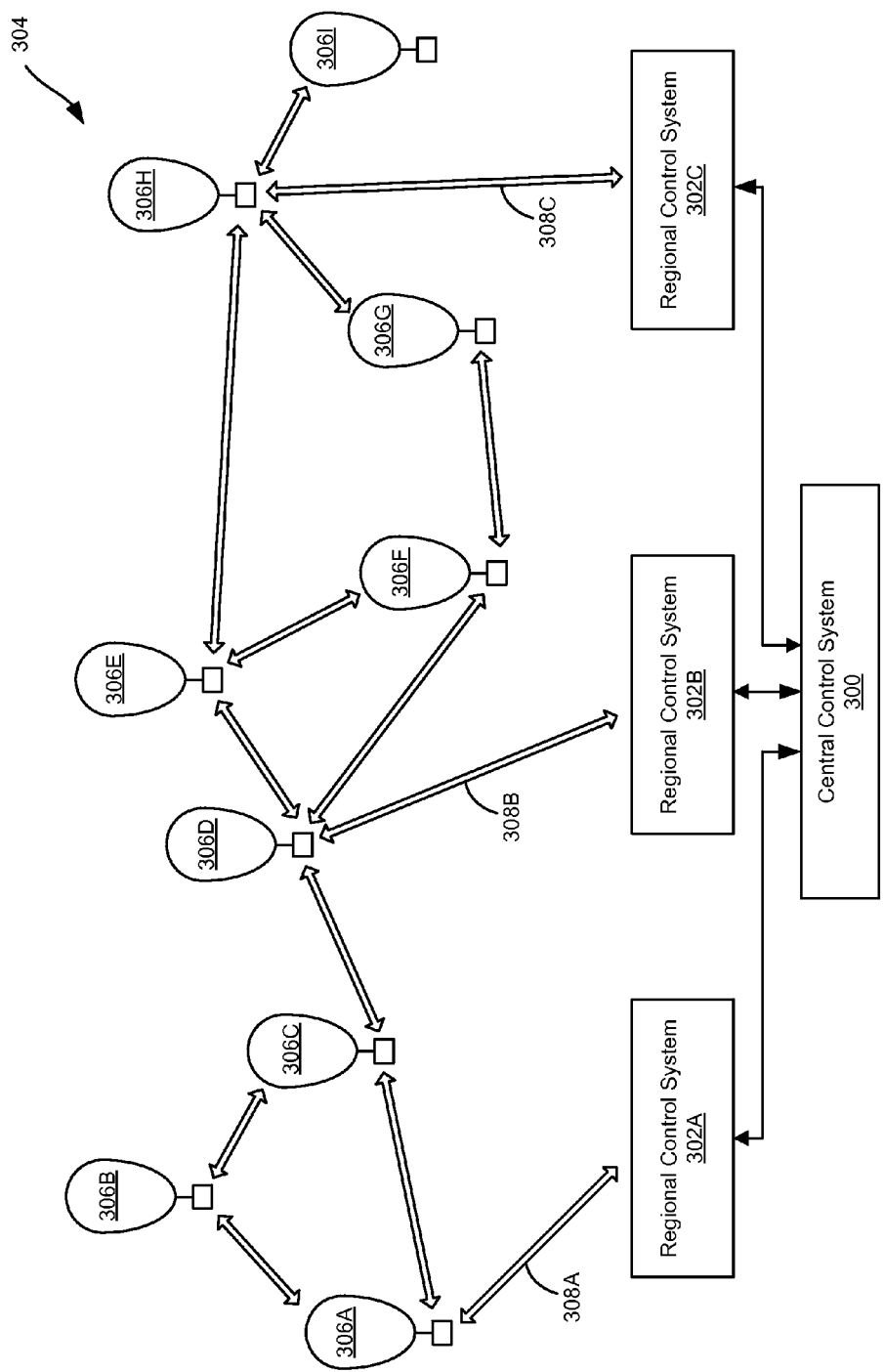
FIG. 3 illustrates a centralized system for controlling a balloon network, according to an embodiment.

Mesh networking, station-keeping functions, or both can be centralized. For example, FIG. 3 illustrates a centralized system for controlling a balloon network 304. In particular, a central control system 300 is in communication with regional control-systems 302A-302C. The central control system 300 can be configured to coordinate functionality of the balloon network 304. To this end, the central control system 300 can control functions of balloons 306A to 306I.

The central control system 300 can communicate with the balloons 306A-306I by way of the regional control systems 302A-302C. Each of the regional control systems 302A-302C can be a ground-based station, such as, for example, the ground-based station 206 discussed above in connection with FIG. 2. Each of the regional control systems 302A-302C can cover a different geographic area. The geographic areas can overlap or be separate. Each of the regional control systems 302A-302C can receive communications from balloons in the respective regional control system's area. In addition, each of the regional control systems 302A-302C can aggregate data from balloons in the respective regional control system's area. The regional control systems 302A-302C can send information they receive to the central control system 300. Further, the regional control systems 302A-302C can route communications from the central control system 300 to the balloons 306A-306I in their respective geographic areas. For instance, the regional control system 302A can relay communications between the balloons 306A-306C and the central control system 300. Likewise, the regional control system 302B can relay communications between the balloons 306D-306F and the central control system 300. Likewise, the regional control system 302C can relay communications between the balloons 306G-306I and the central control system 300.

To facilitate communications between the central control system 300 and the balloons 306A-306I, some of the balloons 306A-306I can serve as downlink balloons. The downlink balloons can communicate with the regional control systems 302A-302C. Accordingly, each of the regional control systems 302A-302C can communicate with a downlink balloon in the geographic area that the regional control system covers. In the balloon network 304, the balloons 306A, 306D, and 306H serve as downlink balloons. The regional control system 302A can communicate with the downlink balloon 306A by way of communication link 308A. Likewise, the regional control system 302B can communicate with the downlink balloon 306D by way of communication link 308B. Likewise, the regional control system 302C can communicate with the balloon 306H by way of communication link 308C. The communication links 308A-308C can be optical links or RF links, depending on the desired implementation.

In the balloon network 304, three of the balloons serve as downlink balloons. In an implementation, all of the balloons in a balloon network can serve as downlink balloons. In another implementation, fewer than three balloons or more than three balloons in a balloon network can serve as downlink balloons.

The central control system 300 can coordinate mesh-networking functions of the balloon network 304. For example, the balloons 306A-306I can send the central control system 300 state information. The central control system 300 can utilize the state information to determine the state of the balloon network 304. State information from a given balloon can include data such as, for example, location data identifying the relative or absolute location of the balloon. In addition, the state information from the given balloon can include data representing wind speeds near the balloon. In addition, the state information from the given balloon can include information about an optical link that the balloon has established. For example, the information about the optical link can include the identity of other balloons with which the balloon has established an optical link, the bandwidth of the optical link, wavelength usage, or availability on an optical link. Accordingly, the central control system 300 can aggregate state information from some or all of the balloons 306A-306I in order to determine an overall state of the balloon network 304.

The overall state of the balloon network 304 can be used to coordinate mesh-networking functions, such as, for example, determining lightpaths for connections. For example, the central control system 300 can determine a current topology based on the aggregate state information from some or all of the balloons 306A-306I. The topology can indicate which optical links are available in the balloon network 304. In addition, the topology can indicate which wavelengths are available for use with the links. The central control system 300 can send the topology to some or all of the balloons 306A-306I so that a routing technique can be employed to select appropriate lightpaths (and possibly backup lightpaths) for communications that use the balloon network 304.

In addition, the central control system 300 can coordinate station-keeping functions of the balloon network 304. For example, the central control system 300 can receive state information from the balloons 306A-306I, as discussed above, and can use the state information as an input to an energy function. The energy function can compare the current topology of the network to a desired topology and, based on the comparison, provide a vector indicating a direction of movement (if any) of each balloon. Further, the central control system 300 can use altitudinal wind data to determine respective altitude adjustments that can be initiated in order to achieve the movement towards the desired topology.

Accordingly, the arrangement shown in FIG. 3 provides for coordinating communications between the central control system 300 and the balloon network 304. This arrangement can be useful to provide centralized control for a balloon network that covers a large geographic area. When expanded, this arrangement can support a global balloon network, which can provide global coverage.

This disclosure contemplates arrangements other than the arrangement shown in FIG. 3. For example, an arrangement can include a centralized control system, regional control systems, and sub-region systems. The sub-region systems can serve to provide communications between the centralized control system and the corresponding regional control systems. As another example, control functions of a balloon network can be provided by a single, centralized, control system. The control system can communicate directly with one or more downlink balloons.

The central control system 300 and the regional control systems 302A-302C need not control and coordinate all of the functions of the balloon network 304. In an implementation, a ground-based control system and a balloon network can share control and coordination of the balloon network. In another implementation, the balloon network itself can control and coordinate all of the functions of the balloon network. Accordingly, in this implementation, the balloon network can be controlled without a need for ground-based control. To this end, certain balloons can be configured to provide the same or similar functions as those discussed above in connection with the central control system 300 and the regional control systems 302A-302C.

In addition, control of a balloon network, coordination of the balloon network, or both can be de-centralized. For example, each balloon in a balloon network can exchange state information with nearby balloons. When the balloons exchange state information in this way, each balloon can individually determine the state of the network. As another example, certain balloons in a balloon network can serve as aggregator balloons. The aggregator balloons can aggregate state information for a given portion of the balloon network. The aggregator balloons can coordinate with one another to determine the overall state of the network.

Control of a balloon network can be localized in a way that the control does not depend on the overall state of the network. For example, balloons in a balloon network can implement station-keeping functions that only consider nearby balloons. In particular, each balloon can implement an energy function that takes into account the balloon's own state and the states of nearby balloons. The energy function can be used to maintain the balloon at a desired position or to move the balloon to a desired position in relation to nearby balloons, without considering the desired topology of the balloon network as a whole. When each balloon in the balloon network implements an energy function in this way, the balloon network as a whole can maintain a desired topology or move towards a desired topology.

For example, assume that a given balloon $B_0$ receives distance information $d_1, d_2, d_3, \ldots, d_k$. The distance information $d_1$ represents the distance from the balloon $B_0$ to its neighboring balloon $B_1$. Likewise, the distance information $d_2$ represents a distance from the balloon $B_0$ to its neighboring balloon $B_2$, the distance $d_3$ represents a distance from the balloon $B_0$ to its neighboring balloon $B_3$, and the distance $d_k$ represents a distance from the balloon $B_0$ to its neighboring balloon $B_k$. Accordingly, the distance information represents distances from the balloon to its k closest neighbors. The balloon $B_0$ can treat the distance to each of the k balloons as a virtual spring with vector representing a force direction from the first nearest neighbor balloon i toward balloon $B_0$ and with force magnitude proportional to $d_i$. The balloon $B_0$ can sum each of the k vectors to obtain a summed vector that represents desired movement of the balloon $B_0$. The balloon $B_0$ can attempt to achieve the desired movement by controlling its altitude, as discussed above. This is but one technique for assigning force magnitudes; this disclosure contemplates that other techniques can also be used.

D. Balloon Network with Optical and RF Links Between Balloons

Figure 4:
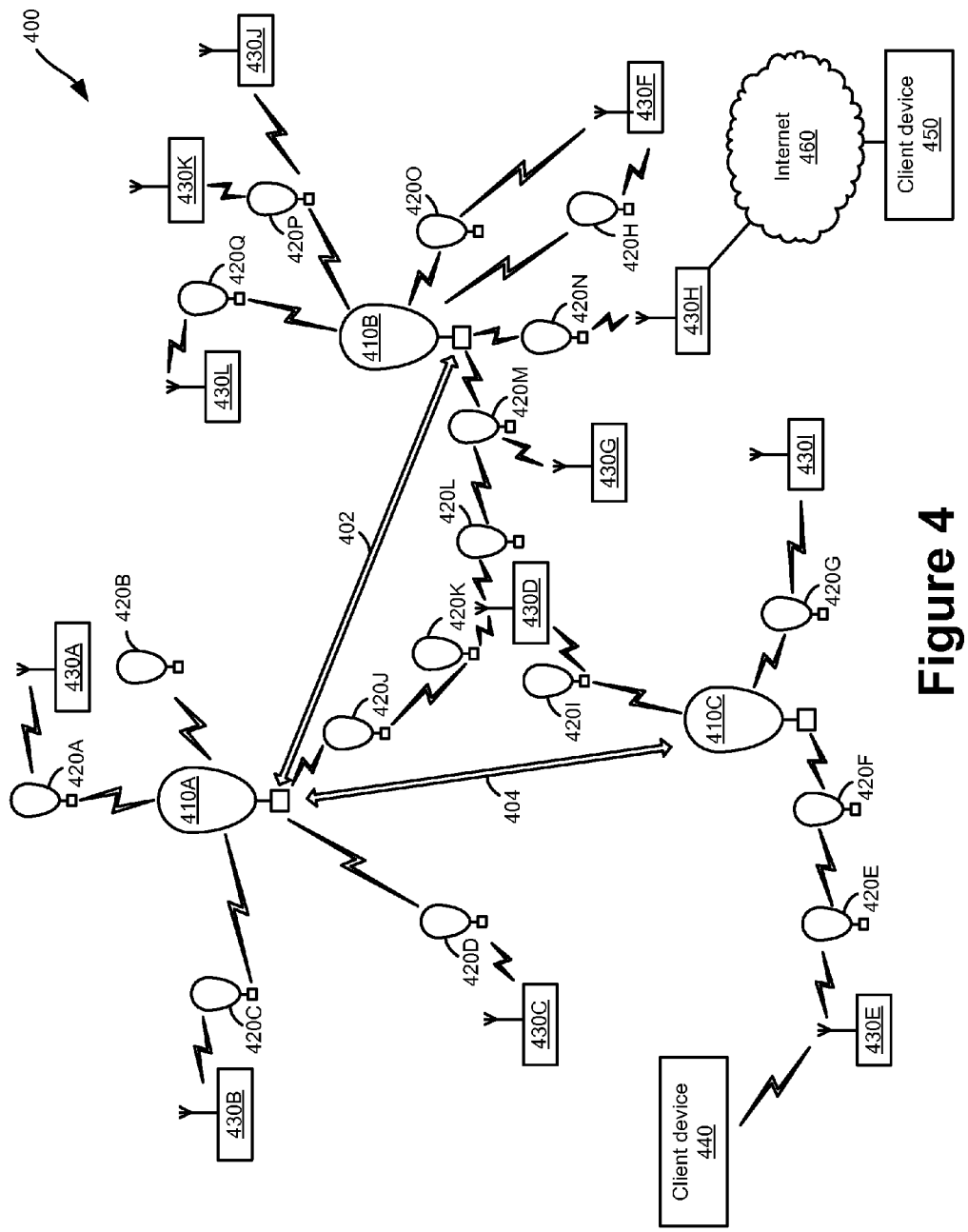
FIG. 4 illustrates a balloon network that includes super-nodes and sub-nodes, according to an embodiment.

A balloon network can include super-node balloons (or simply "super nodes") and sub-node balloons (or simply "sub-nodes"). The super-nodes can communicate with one another by way of optical links. The sub-nodes can communicate with super-nodes by way of RF links. FIG. 4 illustrates a balloon network 400 that includes super-nodes 410A-410C and sub-nodes 420A-420Q, according to an embodiment.

Each of the super-nodes 410A-410C can be provided with a free-space optical communication system that is operable for packet-data communication with other super-node balloons. Accordingly, super-nodes can communicate with one another by way of optical links. For example, the super-node 410A and the super-node 410B can communicate with one another by way of an optical link 402. Likewise, the super-node 410A and the super-node 410C can communicate by way of an optical link 404.

Each of the sub-nodes 420A-420Q can be provided with a radio-frequency (RF) communication system that is operable for packet-data communication over an RF air interface. In addition, some or all of the super-nodes 410A-410C can include an RF communication system that is operable to route packet data to one or more of the sub-nodes 420A-420Q. For example, when the sub-node 420A receives data from the super-node 410A by way of an RF link, the sub-node 420A can use its RF communication system to transmit the received data to a ground-based station 430A by way of an RF link.

In an embodiment, all of the sub-node balloons 420A-420Q can be configured to establish RF links with ground-based stations. For example, all of the sub-nodes 420A-420Q can be configured similarly to the sub-node 420A, which is operable to relay communications between the super-node 410A and the ground-based station 430A by way of respective RF links.

In an embodiment, some or all of the sub-nodes 420A-420Q can be configured to establish RF links with other sub-nodes. For example, the sub-node 420F is operable to relay communications between the super-node 410C and the sub-node 420E. In this embodiment, two or more sub-nodes can provide a multi-hop path between a super-node and a ground-based station. For example, a multi-hop path is provided between the super-node 410C and the ground-based station 430E by way of the sub-node balloons 420E and 420F.

Note that an RF link can be a directional link between a given entity and one or more other entities, or an RF link can be part of an omni-directional broadcast. In the case of an RF broadcast, one or more "links" can be provided by way of a single broadcast. For example, the super-node 410A can establish a separate RF link with each of the sub-nodes 420A-420C. Instead, the super-node 410A can broadcast a single RF signal that can be received by the sub-nodes 420A, 420B, and 420C. The single RF broadcast can in effect provide all of the RF links between the super-node balloon 410A and the sub-node balloons 420A-420C.

Generally, the free-space optical links between super-node balloons have more bandwidth capacity than the RF links between super-node balloons and sub-node balloons. Further, free-space optical communication can be received at a much greater distance than RF communications. As such, the super-node balloons 410A-410C can function as the backbone of the balloon network 400, while the sub-nodes 420A-420Q can serve as sub-networks that provide access to the balloon network, connect the balloon network to other networks, or both.

As noted above, the super-nodes 410A-410C can be configured for both longer-range optical communication with other super-nodes and shorter-range RF communications with sub-nodes 420A-420Q. For example, the super-nodes 410A-410C can use high-power or ultra-bright LEDs to transmit optical signals by way of the optical links 402, 404. The optical links 402, 402 can extend 100 miles and possibly farther. Configured in this way, the super-nodes 410A-410C can be capable of optical communications at data rates on the order of 10 to 50 Gbit/sec. The sub-nodes can, in turn, communicate with ground-based Internet nodes at data rates on the order of approximately 10 Mbit/sec. For example, the sub-nodes 420A-420Q can connect the super-nodes 410A-410C to other networks or directly to client devices. Note that the data rates and link distances discussed above are illustrative and are not meant to limit this disclosure; other data rates and link distances are possible.

Some or all of the super-nodes 410A-410C can serve as downlink balloons. In addition, the balloon network 420 can be implemented without the use of any of the sub-nodes 420A-420Q. In addition, in an embodiment, the super-nodes 410A-410C can collectively function as a core network (or, in other words, as a backbone network), while the sub-nodes 420A-420Q can function as access networks to the core network. In this embodiment, some or all of the sub-nodes 420A-420Q can function as gateways to the balloon network 400. Note that some or all of the ground-based stations 430A-430L can also, or instead, function as gateways to the balloon network 400.

The network topology of the balloon network 400 is but one of many possible network topologies. Further, the network topology of the balloon network 400 can vary dynamically, as super-nodes and sub-nodes move relative to the ground, relative to one another, or both.

IV. Satellite-Based Routing Processes with a Balloon Network

Figure 5A:
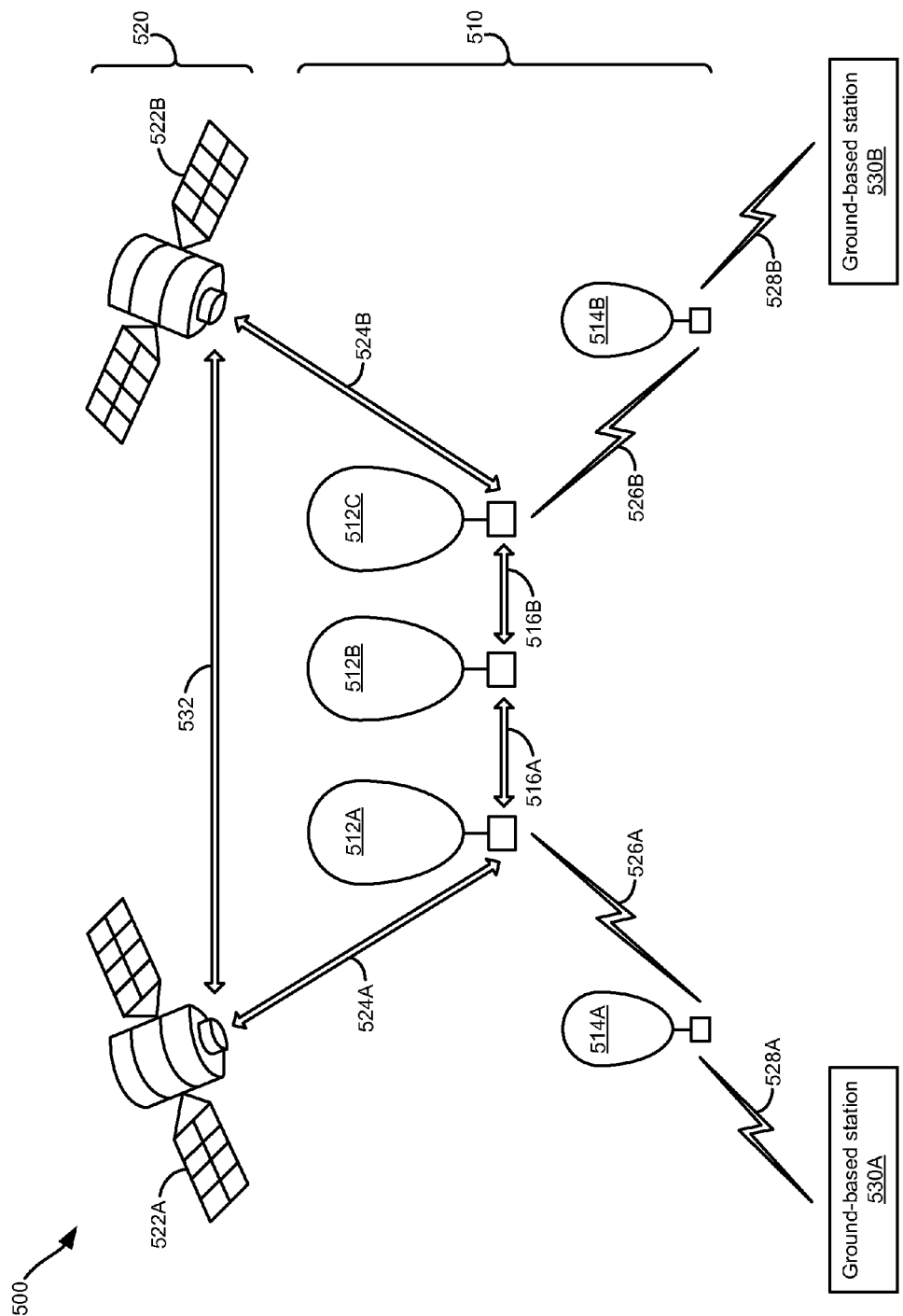
FIGS. 5A-5C illustrate a system in which satellite-based routing processes can be implemented in connection with a balloon network, according to an embodiment.

FIG. 5A illustrates a system 500 in which satellite-based routing processes can be implemented in connection with a balloon network. In particular, the system 500 includes a balloon network 510, a satellite network 520, and ground-based stations 530A-530B.

The balloon network 510 includes super-node balloons (or simply "super-nodes") 512A-512C and sub-node balloons (or simply "sub-nodes") 514A-514B. Each of the balloons in the balloon network 510 can be configured identical to or similar to the balloon 100 discussed above in connection with FIG. 1. In another implementation, some or all of the balloons in the balloon network 510 can be different in configuration from the balloon 100. The super-nodes 512A-512C can be configured identical to or similar to the super-nodes discussed above in connection with FIG. 4. In addition, the sub-nodes 514A-514C can be configured identical to or similar to the sub-nodes discussed above in connection with FIG. 4.

Generally, the super-nodes 514A-514C are configured for relatively long-range optical communication with other super-nodes, for relatively long-range communication with satellites, and for relatively short-range radio-frequency (RF) communication with sub-nodes. In particular, the super-node 512A can communicate with the super-node 512B by way of the optical link 516A and with the sub-node 514A by way of the RF link 518A. Similarly, the super-node 512C can communicate with the super-node 512B by way of the optical link 516B and with the sub-node 514B by way of the RF link 518B. Similarly, the super-node 512B can communicate with the super-nodes 512A, 512C, and with one or more sub-nodes, although the one or more sub-nodes are omitted from FIG. 5A to simplify the illustration. In addition, the super-node 512A can communicate with the satellite 522A by way of the link 524A. Similarly, the super-node 512C can communicate with the satellite 522B by way of the link 524B. Similarly, the super-node 512B can communicate with one or more satellites by way of one or more links, although the one or more links are omitted from FIG. 5A to simplify the illustration. To communicate with satellites and sub-nodes, the super-nodes 512A-512C can utilize any suitable communication technique, including some of the communication techniques discussed above in connection with FIGS. 2-4.

Generally, the sub-nodes 514A-514B are configured for relatively short-range RF communication with super-nodes and for relatively short-range RF communication with ground-based stations. In particular, the sub-node 514A can communicate with the super-node 512A by way of the RF link 526A and with the ground-based station 530A by way of the RF link 528A. Similarly, the sub-node 514B can communicate with the super-node 512 C by way of the RF link 526B and with the ground-based station 530B by way of the RF link 528B. To communicate with super-nodes and ground-based stations, the sub-nodes 514A-514B can utilize any of the communication techniques discussed above in connection with FIGS. 2-4.

As noted above, the system 500 includes a satellite network 520. The satellite network 500 can include any number of space-based satellites. The satellites can be of any suitable type. Examples of suitable types of satellites include communications satellites, navigational satellites, Earth observation satellites, and weather satellites. In addition, one or more of the satellites in the satellite network 520 can be a combination of these satellites or a variation of these satellites. In FIG. 5A, the satellite network 520 is shown to include two satellites, namely satellites 522A-522B, for ease of explanation.

Generally, the satellites 522A-522B are configured for relatively long-range communication with each other, with high-altitude balloons, and with ground-based stations. In particular, the satellite 522A can communicate with the satellite 522B by way of the communication link 532 and with the super-node 512A by way of the communication link 524A. In addition, the satellite 522A can communicate with ground-based stations, such as the ground-based station 530A, by way of communication links, although the communication links are omitted from FIG. 5A to simplify the illustration. Similarly, the satellite 522B can communicate with the satellite 522A by way of the communication link 532 and with the super-node 512C by way of the communication link 524B. In addition, the satellite 522B can communicate with ground-based stations, such as the ground-based station 530A, by way of communication links, although the communication links are omitted from FIG. 5A to simplify the illustration.

The satellites 522A-522B can use any suitable communication protocol and frequency range for communicating with one another. For example, the satellites 522A-522B can communicate with one another in the radio frequency range. As another example, the satellites 522A-522B can communicate with the use of lasers. These examples are illustrative only; the satellites 522A-522B can communicate in any way that is currently known in the art or is yet to be known in the art.

In addition, the satellites 522A-522B can use any suitable communication protocol and frequency range to communicate with high-altitude balloons and ground-based stations. For example, the satellites 522A-522B can communicate with the balloons and ground-based stations in a suitable microwave range. An example of a suitable microwave range is the IEEE C-band, which corresponds to a frequency range of 4-8 GHz. Another example of a suitable microwave range is the IEEE $K_u$ band, which corresponds to a frequency range of 12-18 GHz.

In addition, the satellites 522A-522B can employ communication techniques to account for propagation delays between the satellites 522A-522B and terrestrial networks. An example of such a technique, typically used in connection with a TCP/IP network, is commonly referred to as TCP acceleration or IP spoofing. These examples are illustrative only; other frequency ranges and communication protocols can be used, depending on the desired implementation.

In the system 500, the ground-based stations 530A-B can utilize the balloon network 510, the satellite network 520, or both for the transmission of a communication. In this disclosure, the term "communication," in certain contexts, generally refers to the transmission of information between or among multiple devices; however, the meaning of the term "communication" varies depending on the relevant context. For example, assume that a communication system utilizes data-packet communications. Also assume that a sender device in the system sends a first data packet to an intermediary device in the system and that the intermediary device then sends a corresponding data packet to a recipient device in the system. The data packet and the corresponding data packet can be identical, or the corresponding data packet can be a reformatted version of the data packet. In other words, the data packet and the corresponding data packet correspond in some way, but need not be identical. In this example, the intermediary device is said to receive a communication—in this example, the data packet—from the sender device. In addition, in this example, the recipient device is said to receive a communication from the sender device, the communication including not only the corresponding data packet transmitted from the intermediary device to the recipient device, but also any other data packet used in connection with the corresponding data packet to re-assemble packet-fragmented information.

In addition, in this disclosure, the meaning of the term "path," in connection with communication, depends on the relevant context. In the previous example, from a standpoint of the sender device, the path of the communication is said to be the flow of information from the sender device to the recipient device. From a standpoint of the intermediary device, the path of the communication is said to be the flow of information from the intermediary device to the recipient device. From a standpoint of the relevant network, the path of the communication is said to be the follow of information through the network, from the sender device to the intermediary device to the recipient device.

In addition, in the context of data-packet communications, transmission of information from a sender device to a recipient device can involve a fragmentation of data packets or, in other words, multiple data packets being transmitted by way of multiple different intermediary devices. In this context, the multiple data packets can constitute a communication, and the path of the communication is said to use the network (or networks) in which the multiple intermediary devices operate. For example, with reference to FIG. 5A, assume that the ground-based station 530A transmits a communication, including multiple data packets, to the ground-based station 530B. If all of the data packets are transmitted by way of balloons in the balloon network 510 without being transmitted by way of any of the satellites 522A-522B in the satellite network 520, then the path of the communication is said to use the balloon network 510. Similarly, if all of the data packets are transmitted from the ground-based station 530A to the ground-based station 530B by way of satellites in the satellite network 520 without being transmitted by way of any of the balloons 512A-512C, 514A-514B in the balloon network 510, then the path of the communication is said to use the satellite network 520. Similarly, if the data packets are transmitted from the ground-based station 530A to the ground-based station 530B by way of one or more balloons in the balloon network 510 and one or more satellites in the satellite network 520, then the path of the communication is said to use both the balloon network and the satellite network. Note that in different contexts, the meaning of the terms "communication" and "path" can differ. In addition, a path need not be a single path; that is, a path can include multiple hops, which can be contiguous or non-contiguous, depending on the desired implementation. Depending on factors such as, for example, urgency of a signal to be transmitted or the probability that a chosen path will support a signal as intended, a controller can send one or more packets of a message (in the form of a signal or multiple signals) by way of multiple paths simultaneously, redundantly, or both.

In the system 500, a communication can be received at a balloon in the balloon network 510. Assume, for example, that the balloon 514A serves as a gateway to the balloon network 510 and, accordingly, receives a communication from the ground-based station 530A.

A routing process can be selected based on at least one parameter associated with the communication. With reference to the previous example, in an implementation, the balloon 514A can identify one or more parameters of the communication and, based on the analysis, select a routing process. For example, the one or more parameters associated with the communication can identify a priority of the communication. If the communication has a sufficiently high priority (or a sufficiently low priority), then the balloon 514A can select a routing process that is associated with, or designated for, communications of sufficiently high (or low) priorities. The priority of the communication can be, for example, associated with a quality-of-service (QOS) parameter of the communication. Accordingly, in some implementations, if a subscriber of a communication service, such as a broadband service, has a premium subscription, then the communication associated with the subscriber's device (or devices) can be designated high-priority communication. In this example, a routing process can be selected for that high-priority communication at the balloon 514A.

In general, a routing process can be selected from many possible routing processes. For ease of explanation, some of the following examples refer to two routing processes. The first routing process can determine a first path that uses both the balloon network 510 and the satellite network 520. The second routing process can determine a second path that uses the balloon network 510 and does not use the satellite network 520. Note that the selected routing process can determine the target path in any suitable manner, such as, for example, by utilizing one or more of the routing techniques discussed above in connection with FIGS. 2-4, as well as those routing techniques that are known in the art or yet to be known in the art.

Figure 5B:
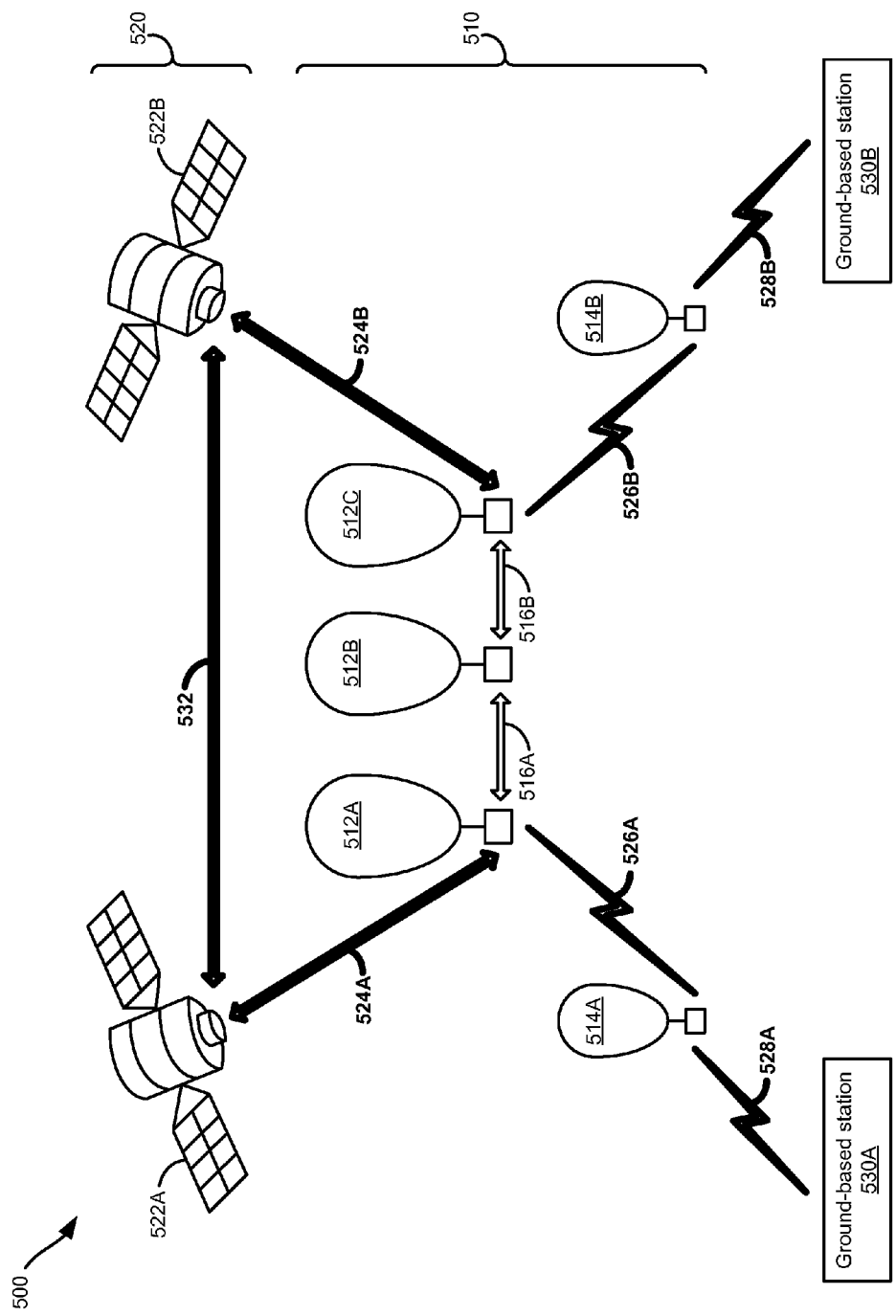

FIG. 5B shows the system 500 of FIG. 5A, with the relevant communication links emphasized in bold to illustrate the first path that is determined by the first routing process. As mentioned above, the first path uses both the balloon network 510 and the satellite network 520. In particular, the first path extends along the communication links 528A, 526A, 524A, 532, 524B, 526B, and 528A. In operation, the first path involves several transmissions of the communication. In particular, the first path involves a transmission from the balloon 514A to the balloon 512A, a transmission from the balloon 512A to the satellite 522A, a transmission from the satellite 522A to the satellite 522B, a transmission from the satellite 522B to the balloon 512C, a transmission from the satellite 512C to the balloon 514B, and a transmission from the balloon 514B to the ground-based station 530B. Accordingly, when the first routing process is used, the communication transmitted by way of the ground-based station can be routed along the communication links through which the first path extends. Note that in some implementations, a majority of the data packets can be routed along the communication links through which the first path extends, while other data packets can be routed along at least some other communication links.

Figure 5C:
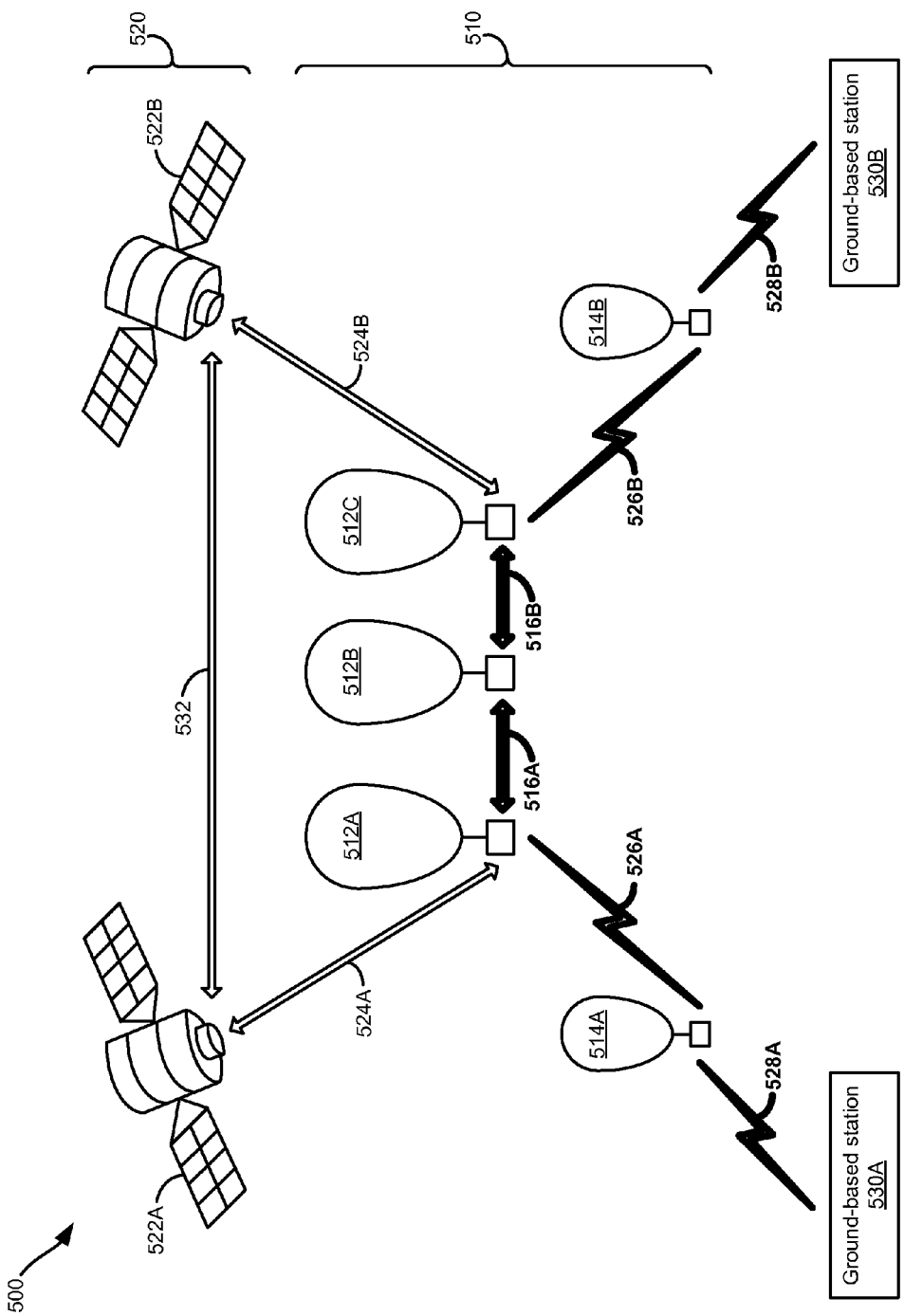

FIG. 5C shows the system 500 of FIG. 5A, with the relevant links emphasized in bold to illustrate the second path that is determined by the second routing process. As mentioned above, the second path uses the balloon network 510 and does not use the satellite network 520. In particular, the second path extends along the communication links 528A, 526A, 516A, 516B, 526B, and 528B. In operation, the second path involves several transmissions of the communication. In particular, the second path involves a transmission from the balloon 514A to the balloon 512A, a transmission from the balloon 512A to the balloon 512B, a transmission from the balloon 512B to the balloon 512C, a transmission from the balloon 512C to the balloon 514B, and a transmission from the balloon 514B to the ground-based station 530B. Accordingly, when the second routing process is used, the communication from the ground-based station can be routed along the communication links through which the second path extends. Note that in some implementations, a majority of the data packets can be routed along the communication links through which the second path extends, while other data packets can be routed along at least some other communication links.

Accordingly, various routing processes can be used for routing a communication between ground-based stations. At least one of these routing processes uses both the balloon network 510 and the satellite network 520, and at least one of these routing processes uses only the balloon network 510. In some implementations, higher-priority communication or, in other words, communication for which a priority exceeds a threshold, can be routed with the routing process that uses both the balloon network 510 and the satellite network 520. These implementations can be useful, for example, when there is high latency in the balloon network 510 or, in other words, when the latency in the balloon network 510 exceeds a threshold. In this situation, the satellite network 520 can be used as a supplemental network for some communication, such as, for example, high-priority communication, or for most or all general types of communication. In other implementations, the opposite configuration can be used; in particular, higher-priority communication can be routed with the routing process that uses only the balloon network 510. These implementations can be useful when the higher-priority communication is time-sensitive and when there are long propagation delays involved in using the satellite network 520.

In some implementations, the balloon 514A, after receiving the communication, can determine a real-time network condition of the balloon network 510. For example, if the balloon network 510 has a relatively high latency, then the balloon 514A can select a routing process that determines a path that uses both the balloon network 510 and the satellite network 520. As an alternative, the routing process can determine a path that uses only the satellite network 510.

In addition, one or more of the balloons in the balloon network 510 can include functionality for performing protocol conversion on received communication. For example, with reference to FIG. 5B, the balloon 512A, upon receiving communication, can convert the communication to a protocol that is suitable for communication with the satellite 522A. In addition, one or more of the balloons in the balloon network 510 can include functionality for repeating communication. For example, the balloon 512A, upon receiving one or more data packets, can repeat the one or more data packets to the satellite 522A by amplifying the data packets, by validating any error-correction or error-detection information in connection with the data packets, by supplementing the data packets with error-correction or error-detection information, or by performing a combination of these or other techniques. These examples are illustrative only; this disclosure contemplates that communication can be protocol-converted or repeated using various other techniques.

Note that while FIGS. 5A-5C are discussed above with reference to the balloon 514A selecting the routing process for the communication, in some implementations, the balloon 514A need not select the routing process. For example, the ground-based station 530A can select the routing process prior to sending the communication to the balloon 514A. As another example, the balloon 514A can route the communication to another balloon, such as, for example, balloon 512A, and the other balloon can select the routing process. As yet another example, the routing process can be selected by a central control system, such as, for example, the central control system 300 discussed above in connection with FIG. 3. As still another example, the routing process can be selected by a regional control system, such as, for example, one of the regional control systems 302A-302C discussed above in connection with FIG. 3. These examples are illustrative only; this disclose contemplates various other entities that can select a routing process.

FIGS. 5A-5C shows the balloon network 510 to include three super-nodes and two sub-nodes for ease of explanation. Note that the balloon network 510 can be provided with any number of super-nodes and any number of sub-nodes. In addition, each of the super-nodes can communicate with any combination and number of satellites, super-nodes, sub-nodes, and ground-based stations. In addition, the balloon network 510 need not even use the sub-node/super-node configuration. Instead, in some implementations, the balloon network 510 can be configuration so that each of the balloons in the balloon network 510 can communicate directly both with satellites and with ground-based stations. In addition, the system 500 can use another balloon network, such as, for example, one of the balloon networks 200, 300, 400 discussed above in connection with FIGS. 2-4. Further, the system 500 can use a variation of any of the balloon networks 200, 300, 400, a combination of the balloon networks 200, 300, 400, or a different balloon network altogether.

In addition, the satellite network 520 can include any number of satellites, even a single satellite. Accordingly, the balloon network 510 can communicate with a single satellite or with multiple satellites.

Although FIGS. 5A-5C are discussed above in connection with the balloon network 510 serving as a gateway, both to the ground-based station 530A and to the satellite 522B, the balloon network 510 need not serve as a gateway in this manner. For example, in some implementations, the ground-based station 530A can communicate directly with the satellite 522A. In this example, the balloon network 510 can serve as a gateway to the satellite network 520 in the first instance, rather than to the ground-based station 530A. Likewise, in some implementations, the balloon network 510 can receive communication from a ground-based station and route that communication to a satellite network; the satellite network can then route that communication directly to another ground-based station.

V. Methods for Using Satellite-Based Routing Processes with a Balloon Network

Figure 6:
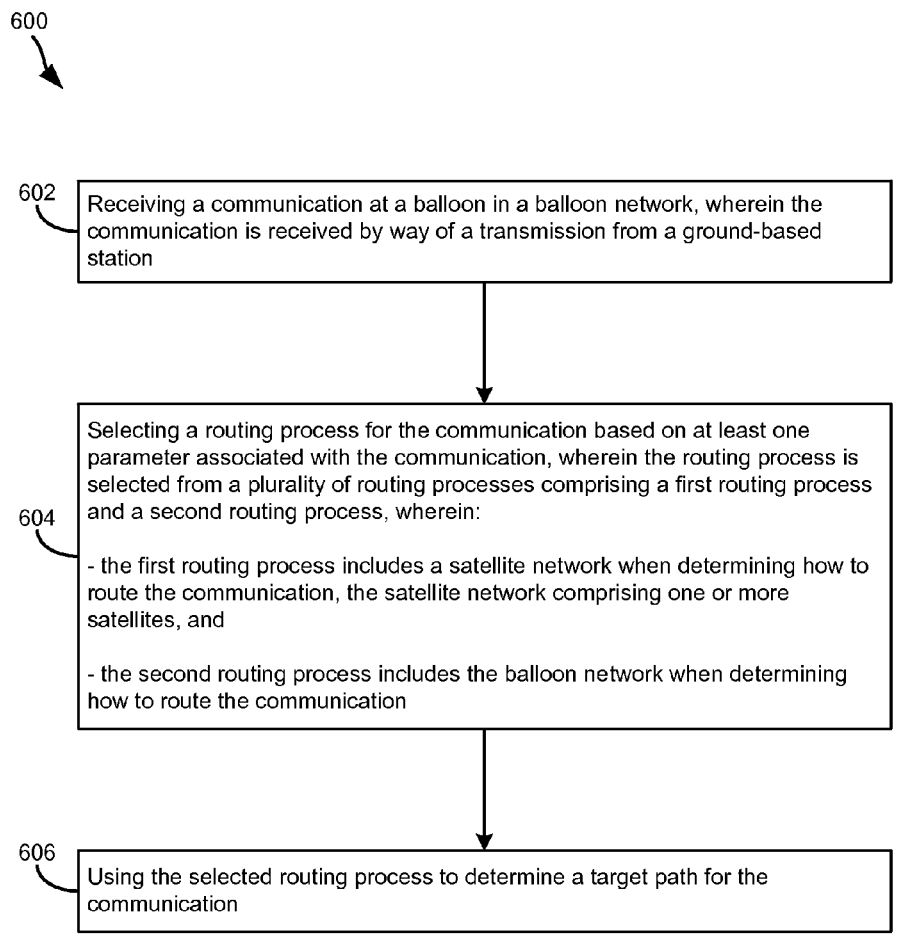
FIG. 6 illustrates a method for using a satellite-based routing process in connection with a balloon network, according to an embodiment.

FIG. 6 illustrates a method 600 for using a satellite-based routing process in connection with a balloon network, according to an embodiment. The method 600 can be implemented in connection with the balloon 100 discussed above in connection with FIG. 1. In particular, the payload 106 of the balloon 100 can implement part or all of the method 600. In addition, the method 600 can be implemented in connection with the balloon network 200 discussed above in connection with FIG. 2. In particular, any of the ground-based stations 206, 212, one or more of the balloons 202A-202F, or any combination of these, can implement part or all of the method 600. In addition, the method 600 can be implemented in connection with the balloon network 300 discussed above in connection with FIG. 3. In particular, any of the central control system 300, one or more of the regional control systems 302A-302C, one or more of the balloons 306A-306I, or any combination of these, can implement part or all of the method 600. In addition, the method 600 can be implemented in connection with the balloon network 400 discussed above in connection with FIG. 4. In particular, any of the ground-based stations or balloons illustrated in FIG. 4, or any combination of the ground-based stations and balloons illustrated in FIG. 4, can implement part or all of the method 600. In addition, the method 600 can be implemented in connection with the system 500 discussed above in connection with FIG. 4. In particular, any of the ground-based stations 530A-530B, any of the balloons 512A-512C and 514A-514B, or any combination of these can implement part or all of the method 600. In addition, the method 600 can be implemented in connection with the computing device 700 discussed below in connection with FIG. 7.

In an embodiment, the second routing process does not include the satellite network when determining how to route the communication. Alternatively, in another embodiment, the second routing process can include the satellite network when determining how to route the communication. In addition, in an embodiment, the first routing process can include the balloon network when determining how to route the communication.

At block 602, the method 600 includes receiving a communication at a balloon in a balloon network. The communication is received by way of a transmission from a ground-based station.

At block 604, the method 600 includes selecting a routing process for the communication based on at least one parameter associated with the communication. The routing process is selected from a plurality of routing processes. The plurality of routing processes include a first routing process and a second routing process. The first routing process includes a satellite network when determining how to route the communication. The satellite network includes one or more satellites. The second routing process includes the balloon network when determining how to route the communication.

The selection of the routing process can be accomplished in various ways. In an embodiment, at block 604, the method includes determining a latency of the balloon network, determining whether the latency exceeds a threshold, and responsive to a determination that the latency exceeds the threshold, selecting the first routing process. In another embodiment, at block 604, the method includes determining a priority of the communication, determining whether the priority exceeds a threshold, and responsive to a determination that the priority exceeds the threshold, selecting the first routing process.

The routing process can be selected using various entities. In an embodiment, the routing process is selected at the balloon in the balloon network. In another embodiment, the routing process is selected at another balloon in the balloon network. In yet another embodiment, the routing process is selected at multiple balloons in the balloon network. In yet another embodiment, the routing process is selected at a controller outside the balloon network.

The selected routing process can include multiple transmissions. In an embodiment, the selected routing process includes a first transmission of the communication and a second transmission of the communication. In the embodiment, the first transmission includes sending the communication from the balloon network to the satellite network. In addition, in the embodiment, the second transmission includes sending the communication from the satellite network to the balloon network. In addition, the selected routing process can include a third transmission of the communication. The third transmission occurs after the second transmission of the communication. The third transmission includes sending the communication from the balloon network to a second ground-based station.

The parameter(s) associated with the communication can vary, depending on the desired embodiment. In an embodiment, the at least one parameter includes a network condition. In another embodiment, the at least one parameter includes a quality of service (QOS) parameter.

The routing processes can be determined at various entities. In an embodiment, the method 600 includes determining at least one of the first routing process and the second routing process at the balloon. In another embodiment, the method 600 includes determining at least one of the first and second routing processes at another balloon. In yet another embodiment, the method 600 includes determining at least one of the first and second routing processes at multiple balloons. In yet another embodiment, the method 600 includes determining at least one of the first and second routing processes at a controller outside the balloon network.

At block 606, the method 600 includes using the selected routing process to determine a target path for the communication.

The method can involve performing protocol conversion at the balloon. In an embodiment, the received communication is based on a first protocol. In addition, in the embodiment, the method 600 further includes in response to a selection of the first routing process, generating, at the balloon, a second communication based on a second protocol. In addition, in the embodiment, the method 600 further includes sending the second communication to at least one satellite of the one or more satellites.

In an embodiment, the method 600 further includes, after receiving the communication, determining a real-time network condition. In the embodiment, the routing process is further selected based on the real-time network condition.

In an embodiment, the method 600 further includes, in response to a selection of the first routing process, sending the communication to at least one satellite of the one or more satellites.

VI. Computing Device and Computer Program Product

Figure 7:
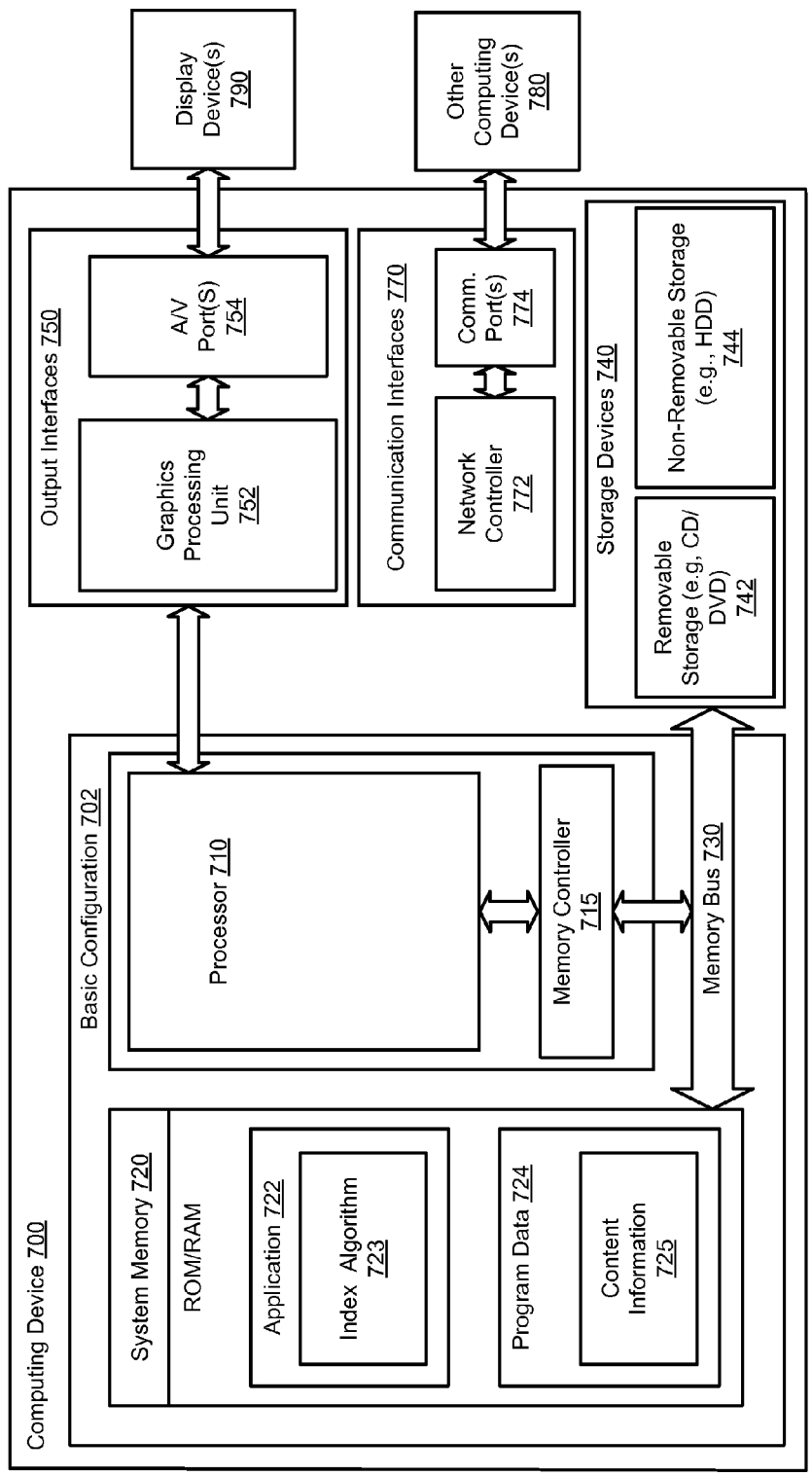
FIG. 7 illustrates a functional block diagram of a computing device, according to an embodiment.

FIG. 7 illustrates a functional block diagram of a computing device 700, according to an embodiment. The computing device 700 can be used to perform functions in connection with satellite-based routing processes with a balloon network. In particular, the computing device can be used to perform some or all of the functions discussed above in connection with FIGS. 1-6.

The computing device 700 can be or include various types of devices, such as, for example, a server, personal computer, mobile device, cellular phone, or tablet computer. In a basic configuration 702, the computing device 700 can include one or more processors 710 and system memory 720. A memory bus 730 can be used for communicating between the processor 710 and the system memory 720. Depending on the desired configuration, the processor 710 can be of any type, including a microprocessor (µP), a microcontroller (µC), or a digital signal processor (DSP), among others. A memory controller 715 can also be used with the processor 710, or in some implementations, the memory controller 715 can be an internal part of the processor 710.

Depending on the desired configuration, the system memory 720 can be of any type, including volatile memory (such as RAM) and non-volatile memory (such as ROM, flash memory). The system memory 720 can include one or more applications 722 and program data 724. The application(s) 722 can include an index algorithm 723 that is arranged to provide inputs to the electronic circuits. The program data 724 can include content information 725 that can be directed to any number of types of data. The application 722 can be arranged to operate with the program data 724 on an operating system.

The computing device 700 can have additional features or functionality, and additional interfaces to facilitate communication between the basic configuration 702 and any devices and interfaces. For example, data storage devices 740 can be provided including removable storage devices 742, non-removable storage devices 744, or both. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives. Computer storage media can include volatile and nonvolatile, non-transitory, removable and non-removable media implemented in any method or technology for storage of information, such as computer readable instructions, data structures, program modules, or other data.

The system memory 720 and the storage devices 740 are examples of computer storage media. Computer storage media includes, but is not limited to, RAM, ROM, EEPROM, flash memory or other memory technology, CD-ROM, DVDs or other optical storage, magnetic cassettes, magnetic tape, magnetic disk storage or other magnetic storage devices, or any other medium that can be used to store the desired information and that can be accessed by the computing device 700.

The computing device 700 can also include output interfaces 750 that can include a graphics processing unit 752, which can be configured to communicate with various external devices, such as display devices 790 or speakers by way of one or more A/V ports or a communication interface 770. The communication interface 770 can include a network controller 772, which can be arranged to facilitate communication with one or more other computing devices 780 over a network communication by way of one or more communication ports 774. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR), and other wireless media.

The computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 700 can also be implemented as a personal computer including both laptop computer and non-laptop computer configurations.

Figure 8:
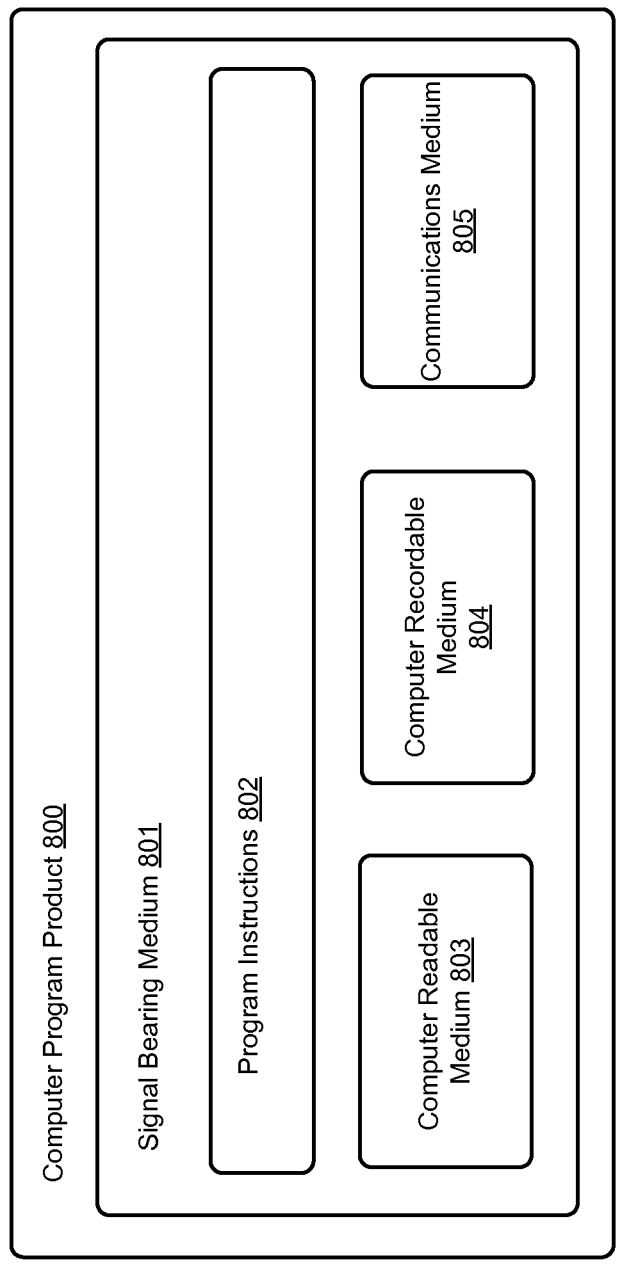
FIG. 8 illustrates a computer program product, according to an embodiment.

The disclosed methods can be implemented as computer program instructions encoded on a non-transitory computer-readable storage medium in a machine-readable format, or on other non-transitory media or articles of manufacture. FIG. 8 illustrates a computer program product 800, according to an embodiment. The computer program product 800 includes a computer program for executing a computer process on a computing device, arranged according to some disclosed implementations.

The computer program product 800 is provided using a signal bearing medium 801. The signal bearing medium 801 can include one or more programming instructions 802 that, when executed by one or more processors, can provide functionality or portions of the functionality discussed above in connection with FIGS. 1-6. In some implementations, the signal bearing medium 801 can encompass a computer-readable medium 803 such as, but not limited to, a hard disk drive, a CD, a DVD, a digital tape, or memory. In some implementations, the signal bearing medium 801 can encompass a computer-recordable medium 804 such as, but not limited to, memory, read/write (R/W) CDs, or R/W DVDs. In some implementations, the signal bearing medium 801 can encompass a communications medium 805 such as, but not limited to, a digital or analog communication medium (for example, a fiber optic cable, a waveguide, a wired communications link, or a wireless communication link). Thus, for example, the signal bearing medium 801 can be conveyed by a wireless form of the communications medium 805 (for example, a wireless communications medium conforming with the IEEE 802.11 standard or other transmission protocol).

The one or more programming instructions 802 can be, for example, computer executable instructions. A computing device (such as the computing device 700 of FIG. 7) can be configured to provide various operations in response to the programming instructions 802 conveyed to the computing device by one or more of the computer-readable medium 803, the computer recordable medium 804, and the communications medium 805.

While various examples have been disclosed, other examples will be apparent to those skilled in the art. The disclosed examples are for purposes of illustration and are not intended to be limiting, with the true scope and spirit being indicated by the following claims.

What is claimed is:

1. A method comprising:
    receiving a communication at a balloon in a balloon network, wherein the communication is received by way of a transmission from a ground-based station;
    selecting a routing process for the communication based on at least one parameter associated with the communication, wherein the routing process is selected from a plurality of routing processes comprising a first routing process and a second routing process, wherein:
        the first routing process includes a satellite network when determining how to route the communication, the satellite network comprising one or more satellites, and
        the second routing process includes the balloon network when determining how to route the communication; and
    using the selected routing process to determine a target path for the communication;
    wherein the first routing process comprises at least a first transmission of the communication, a second transmission of the communication, and a third transmission of the communication that occurs after the second transmission, and wherein:
        (a) the first transmission comprises sending the communication from the balloon network to the satellite network;
        (b) the second transmission comprises sending the communication from the satellite network to the balloon network;
        (c) the third transmission comprises sending the communication from the balloon network to a second ground-based station; and
    wherein the second the second routing process does not include the satellite network.

2. The method of claim 1, wherein the second routing process does not include the satellite network when determining how to route the communication.

3. The method of claim 1, wherein the second routing process includes the satellite network when determining how to route the communication.

4. The method of claim 1, wherein the first routing process includes the balloon network when determining how to route the communication.

5. The method of claim 1, wherein the routing process is selected at another balloon in the balloon network.

6. The method of claim 1, further comprising:
    after receiving the communication, determining a real-time network condition, wherein the routing process is further selected based on the real-time network condition.

7. The method of claim 1, further comprising determining, at the balloon, at least one of the first routing process or the second routing process.

8. The method of claim 1, further comprising:
    in response to a selection of the first routing process, sending the communication to at least one satellite of the one or more satellites.

9. The method of claim 1, wherein the at least one parameter comprises a network condition.

10. The method of claim 1, wherein the at least one parameter comprises a quality of service (QOS) parameter.

11. A method comprising:
    receiving a communication at a balloon in a balloon network, wherein the communication is received by way of a transmission from a ground-based station;
    selecting a routing process for the communication based on at least one parameter associated with the communication, wherein the routing process is selected from a plurality of routing processes comprising a first routing process and a second routing process, wherein:
        the first routing process includes a satellite network when determining how to route the communication, the satellite network comprising one or more satellites, and
        the second routing process includes the balloon network when determining how to route the communication; and
    using the selected routing process to determine a target path for the communication;
    wherein selecting the routing process for the communication comprises: (a) determining a latency of the balloon network, (b) determining whether or not the latency exceeds a threshold, (c) if it is determined that the latency exceeds the threshold, then selecting the first routing process, and (d) otherwise, selecting one of the routing processes other than the first routing process.

12. A method comprising:
    receiving a communication at a balloon in a balloon network, wherein the communication is received by way of a transmission from a ground-based station;

selecting a routing process for the communication based on at least one parameter associated with the communication, wherein the routing process is selected from a plurality of routing processes comprising a first routing process and a second routing process, wherein:
- the first routing process includes a satellite network when determining how to route the communication, the satellite network comprising one or more satellites, and
- the second routing process includes the balloon network when determining how to route the communication; and using the selected routing process to determine a target path for the communication;

wherein selecting the routing process for the communication comprises: (a) determining a priority of the communication, (b) determining whether or not the priority exceeds a threshold, (c) if it is determined that the priority exceeds the threshold, then selecting the first routing process, and (d) otherwise, selecting one of the routing processes other than the first routing process.

13. A method comprising:

receiving a communication at a balloon in a balloon network, wherein the communication is received by way of a transmission from a ground-based station, and wherein the received communication is based on a first protocol;

selecting, from a plurality of routing processes comprising a first routing process and a second routing process, the first routing process, wherein the selection of the first routing process from the plurality of routing processes is based on at least one parameter associated with the communication, and wherein:
- the first routing process includes a satellite network when determining how to route the communication, the satellite network comprising one or more satellites, and
- the second routing process includes the balloon network when determining how to route the communication;

using the first routing process to determine a target path for the communication; and as part of the first routing process: (a) generating, at the balloon, a second communication based on a second protocol, and (b) sending the second communication to at least one satellite of the one or more satellites.

14. A balloon system comprising:

a communication system, wherein the communication system is operable to receive a communication by way of a transmission from a ground-based station; and a controller, wherein the controller is operable to perform functions comprising:

selecting a routing process for the communication based on at least one parameter associated with the communication, wherein the routing process is selected from a plurality of routing processes comprising a first routing process and a second routing process, wherein:
- (i) the first routing process includes a satellite network when determining how to route the communication, the satellite network comprising one or more satellites, and
- (ii) the second routing process includes the balloon network when determining how to route the communication; and using the selected routing process to determine a target path for the communication;

wherein selecting the routing process for the communication comprises: (a) determining a priority of the communication, (b) determining whether or not the priority exceeds a threshold, (c) if it is determined that the priority exceeds the threshold, then selecting the first routing process, and (d) otherwise, selecting one of the routing processes other than the first routing process.

15. The balloon system of claim 14, wherein the second routing process does not include the satellite network when determining how to route the communication.

16. The balloon system of claim 14, wherein the second routing process includes the satellite network when determining how to route the communication.

17. The balloon system of claim 14, wherein the first routing process includes the balloon network when determining how to route the communication.

18. An apparatus comprising at least one non-transitory computer-readable medium having stored thereon program instructions that, upon execution by a computing device, cause the computing device to perform operations comprising:

selecting a routing process for a communication based on at least one parameter associated with the communication, wherein the communication is received by way of a transmission from a ground-based station, wherein the routing process is selected from a plurality of routing processes comprising a first routing process and a second routing process, and wherein:
- the first routing process includes a satellite network when determining how to route the communication, the satellite network comprising one or more satellites, and
- the second routing process includes a balloon network when determining how to route the communication; and causing a balloon system to use the selected routing process to determine a target path for the communication;

wherein selecting the routing process for the communication comprises: (a) determining a priority of the communication, (b) determining whether or not the priority exceeds a threshold, (c) if it is determined that the priority exceeds the threshold, then selecting the first routing process, and (d) otherwise, selecting one of the routing processes other than the first routing process.

19. The apparatus of claim 18, wherein the second routing process does not include the satellite network when determining how to route the communication.

20. The apparatus of claim 18, wherein the second routing process includes the satellite network when determining how to route the communication.

21. The apparatus of claim 18, wherein the first routing process includes the balloon network when determining how to route the communication.

* * * * *